US010830627B2

(12) United States Patent
Gulbrandsen et al.

(10) Patent No.: US 10,830,627 B2
(45) Date of Patent: Nov. 10, 2020

(54) METHOD AND SYSTEM FOR FLUID LEVEL DETERMINATION FROM PRESSURE MEASUREMENT

(71) Applicant: SCHLUMBERGER NORGE AS, Forum (NO)

(72) Inventors: Arild Gulbrandsen, Bergen (NO); Truls Fossdal, Bergen (NO); Ronny Saervold Finnema, Bergen (NO)

(73) Assignee: SCHLUMBERGER NORGE AS, Forum (NO)

( * ) Notice: Subject to any disclaimer, the term of this patent is extended or adjusted under 35 U.S.C. 154(b) by 80 days.

(21) Appl. No.: 15/562,412

(22) PCT Filed: Apr. 13, 2016

(86) PCT No.: PCT/US2016/027383
§ 371 (c)(1),
(2) Date: Sep. 27, 2017

(87) PCT Pub. No.: WO2016/168375
PCT Pub. Date: Oct. 20, 2016

(65) Prior Publication Data
US 2018/0052030 A1    Feb. 22, 2018

Related U.S. Application Data

(60) Provisional application No. 62/147,582, filed on Apr. 15, 2015.

(51) Int. Cl.
*G01F 23/18* (2006.01)
*B01D 33/80* (2006.01)
(Continued)

(52) U.S. Cl.
CPC ........... *G01F 23/185* (2013.01); *B01D 33/03* (2013.01); *B01D 33/807* (2013.01);
(Continued)

(58) Field of Classification Search
CPC .......... B01D 33/03–0392; B01D 21/34; B01D 2221/04; B01D 37/045–046;
(Continued)

(56) References Cited

U.S. PATENT DOCUMENTS 2,613,535 A * 10/1952 Born .................... G01F 23/167
73/302
2,956,581 A * 10/1960 Pearson .................... G01F 3/38
137/391

(Continued)

FOREIGN PATENT DOCUMENTS

WO    2013/174959 A1    11/2013

OTHER PUBLICATIONS

International Preliminary Report on Patentability for the equivalent International patent application PCT/US2016/027383 dated Oct. 26, 2017.

(Continued)

*Primary Examiner* — David L Singer
(74) *Attorney, Agent, or Firm* — Jeffrey D. Frantz

(57) ABSTRACT

An assembly includes at least one container, an injection medium supply, at least one flow line extending from the injection medium supply to an interior portion of the at least one container; and a pressure transducer coupled to each of the at least one flow line.

12 Claims, 4 Drawing Sheets

(51) Int. Cl.
  *B07B 13/18* (2006.01)
  *G01F 23/16* (2006.01)
  *B01D 33/03* (2006.01)
  *B01D 37/04* (2006.01)

(52) U.S. Cl.
  CPC ......... *B01D 33/808* (2013.01); *B01D 37/045* (2013.01); *B01D 37/046* (2013.01); *B07B 13/18* (2013.01); *G01F 23/168* (2013.01); *G01F 23/18* (2013.01); *B07B 2201/04* (2013.01); *B07B 2230/01* (2013.01)

(58) Field of Classification Search
  CPC ...... B07B 2230/04; B03B 13/00; G01N 9/26; G01N 9/32–34; E21B 21/065; E21B 43/08–088; F17C 2250/043–0434; G01F 23/14–185; G01F 22/02
  USPC ............ 73/438, 299–303; 166/267; 210/741; 340/614
  See application file for complete search history.

(56) References Cited

U.S. PATENT DOCUMENTS

| | | | | |
|---|---|---|---|---|
| 3,664,365 | A * | 5/1972 | Ralet ..................... | F16K 41/103 137/206 |
| 4,043,193 | A * | 8/1977 | Bailey .................... | E21B 21/08 73/152.22 |
| 4,625,548 | A * | 12/1986 | Charter .................. | G01F 23/16 73/299 |
| 4,625,553 | A | 12/1986 | Charter | |
| 5,020,368 | A * | 6/1991 | Evans .................... | F17C 13/025 73/299 |
| 5,309,764 | A * | 5/1994 | Waldrop ............... | G01F 23/168 73/302 |
| 5,791,187 | A * | 8/1998 | Chang ................... | G01C 13/008 73/290 R |
| 6,223,906 | B1 * | 5/2001 | Williams ............... | B01D 33/04 210/400 |
| 6,374,825 | B1 * | 4/2002 | Wallin ................... | A61M 16/18 128/203.12 |
| 6,601,449 | B1 * | 8/2003 | Jones .................... | G01F 23/167 73/299 |
| 6,763,714 | B2 * | 7/2004 | Molina .................. | G01F 23/168 73/298 |
| 2005/0242002 | A1 * | 11/2005 | Stone .................. | B01D 33/0376 209/363 |
| 2005/0242003 | A1 * | 11/2005 | Scott .................. | B01D 33/0315 209/363 |
| 2005/0242009 | A1 * | 11/2005 | Padalino ................ | B01D 33/37 210/86 |
| 2006/0243643 | A1 * | 11/2006 | Scott ...................... | B07B 1/4663 209/309 |
| 2006/0260392 | A1 * | 11/2006 | Hedrick ................. | B64D 37/00 73/292 |
| 2007/0039384 | A1 * | 2/2007 | Smith .................... | G01F 23/185 73/299 |
| 2009/0242466 | A1 | 10/2009 | Burnett et al. | |
| 2009/0308484 | A1 | 12/2009 | Nakagawa et al. | |
| 2010/0089652 | A1 * | 4/2010 | Burnett .............. | B01D 33/0376 175/66 |
| 2010/0089802 | A1 * | 4/2010 | Burnett ..................... | B07B 1/46 209/360 |
| 2010/0235002 | A1 * | 9/2010 | Dufilho .................. | B01D 33/37 700/275 |
| 2010/0237024 | A1 * | 9/2010 | Carr .......................... | B07B 1/46 210/780 |
| 2010/0270216 | A1 * | 10/2010 | Burnett .............. | B01D 33/0376 209/606 |
| 2011/0114542 | A1 * | 5/2011 | Carr .......................... | B07B 1/42 209/235 |
| 2011/0210083 | A1 | 9/2011 | Scott et al. | |
| 2012/0006762 | A1 * | 1/2012 | McCabe ............. | B01D 19/0036 210/801 |
| 2012/0118798 | A1 * | 5/2012 | Scott .................. | B01D 33/0315 209/555 |
| 2013/0105412 | A1 * | 5/2013 | Burnett ..................... | B07B 1/46 210/780 |
| 2014/0054216 | A1 * | 2/2014 | Burnett ..................... | B07B 1/28 210/499 |
| 2015/0377020 | A1 * | 12/2015 | Kronenberger ....... | E21B 21/065 210/739 |

OTHER PUBLICATIONS

International Search Report and Written Opinion for the equivalent International patent application PCT/US2016/027383 dated Jul. 22, 2016.

\* cited by examiner

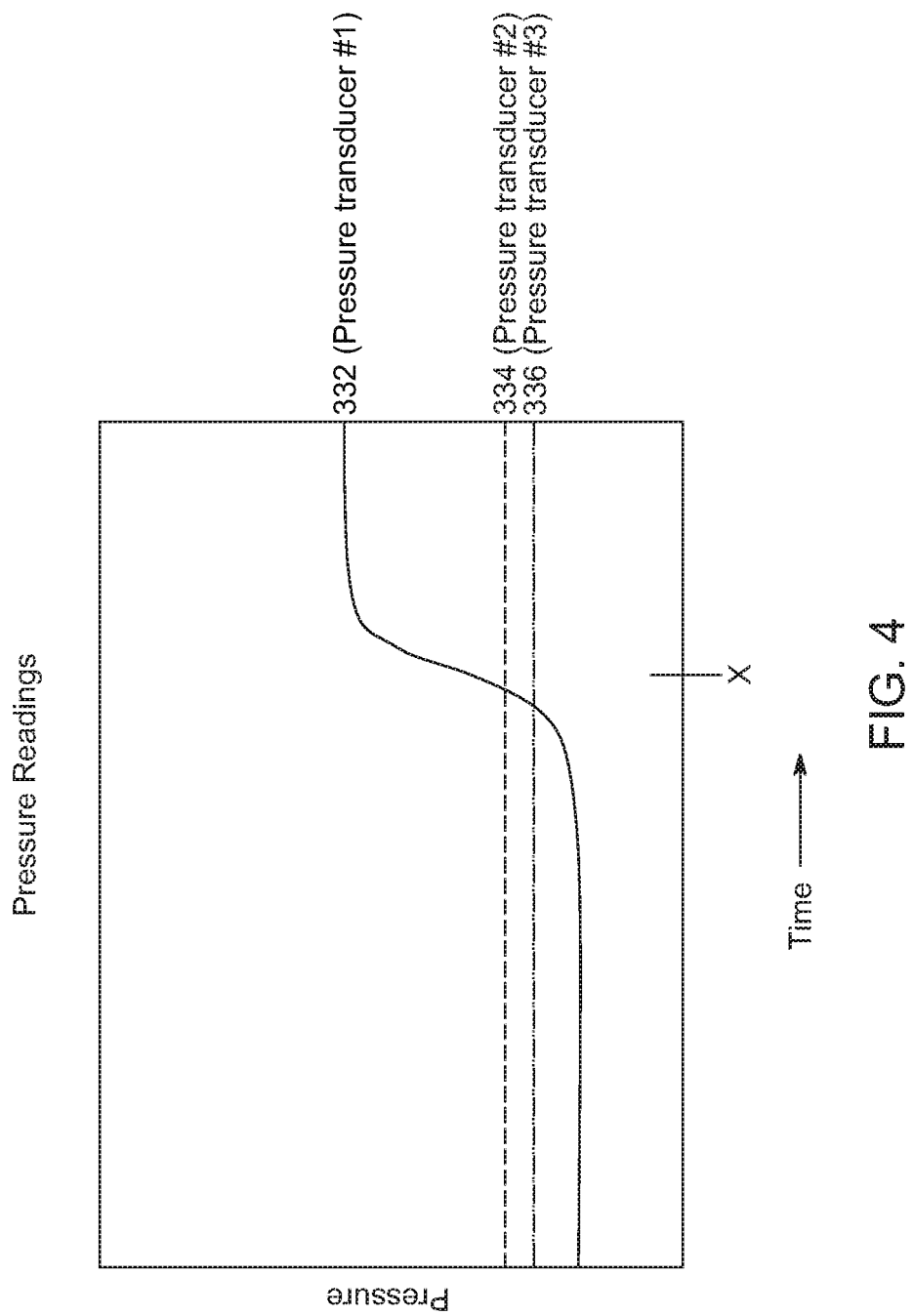

METHOD AND SYSTEM FOR FLUID LEVEL DETERMINATION FROM PRESSURE MEASUREMENT

CROSS REFERENCE TO RELATED APPLICATIONS

This application claims priority from Provisional Patent Application No. 62/147,582, filed Apr. 15, 2015, which is hereby incorporated by reference in its entirety.

BACKGROUND

Fluid level measurement and monitoring may be used in various industries such as the food industry, cleaning industry, automotive industry, oil and gas industry, and others, as well as in various applications for fluid treatment, manufacturing and others.

Some conventional methods for measuring and monitoring the level of fluid in a vessel may include using one or more fluid sensors inside and/or outside the vessel. Fluid sensors may include radio frequency transmitter sensors, radar, ultrasonic sensors and others. Such fluid sensor types may involve determining the surface level of a fluid by timing how long it takes for a wave frequency to reach the fluid surface and return to the sensor. For example, in applications monitoring the level of turbulent fluid, ultrasonic transducer sensors have been used, where the level of the fluid is determined from the average time it takes an ultrasound pulse to travel from the sensor to the fluid surface and back.

Some methods for detecting fluid level may include using a float to float at the surface of the fluid, where the position of the float may be followed as is rises and falls with the level of the fluid. The position of the float may be monitored, for example, mechanically, such as with cables, tapes, etc., using magnetically equipped floats, or using a network of resistors and multiple reed switches to indicate when the float reaches different levels within the vessel.

BRIEF DESCRIPTION OF DRAWINGS

FIG. 4 is a graph of pressure readings from a fluid level measurement assembly according to embodiments of the present disclosure.

DETAILED DESCRIPTION

Figure 1:
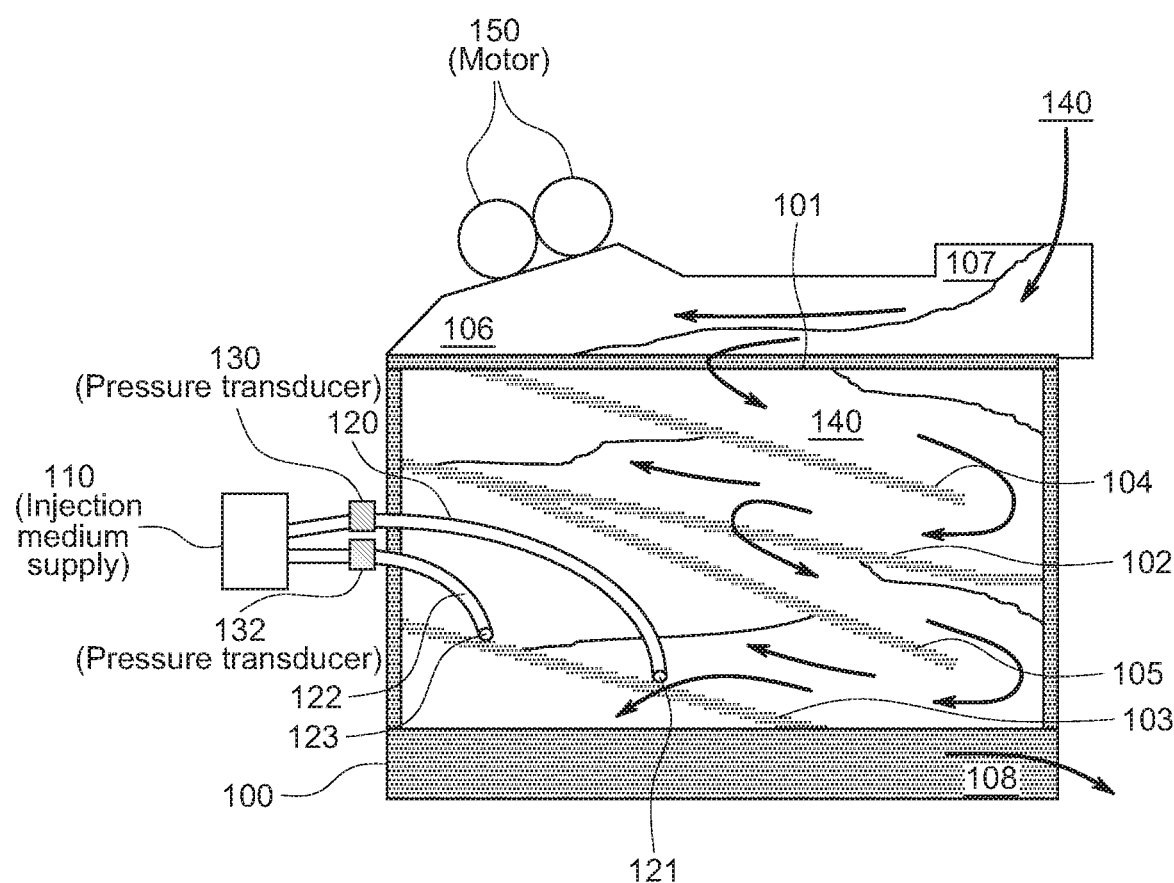
FIG. 1 is a cross sectional view of a fluid level measurement assembly according to embodiments of the present disclosure.

Embodiments disclosed herein relate generally to apparatuses and methods for measuring the level of fluid within a volume. The fluid level may be measured and monitored in volumes capable of containing fluid, including but not limited to, tanks, pits, machinery, fluid processing equipment, ponds, and small containers or containers used in compact environments or applications.

For example, in some embodiments, an assembly for fluid level measurement may include at least one container, an injection medium supply, at least one flow line extending from the injection medium supply to an interior portion of the container, and a pressure transducer attached to each flow line. The injection medium supplied from the injection medium supply may flow through the one or more flow lines into the container at an initial flow rate. Once the fluid level within the container reaches the opening of a flow line, the pressure within such flow line may increase. Alternatively, if an initial flow rate is determined while the fluid level is above the opening of the flow line into the container, the pressure within such flow line may decrease when the fluid level drops below the flow line opening. The pressure transducer disposed along each flow line may measure the pressure in the flow line and indicate any change or spike in pressure, thereby indicating the change in fluid level.

According to some embodiments, a container may be a vibratory separator, where the fluid level in the vibratory separator may be measured and monitored during vibration of the fluid. Vibratory separators may be used in various industries such as the food industry, cleaning industry, waste water treatment, and others. In one type of vibratory separator, the vibratory separator may include a generally horizontal table or an angled table with a perforated filter screen bottom. Fluid is deposited at the feed end of the vibratory separator. As the fluid travels along the length of the vibrating table, the fluid falls through the perforations of a separation screen to a reservoir below, leaving the solid particulate material behind. The vibrating action of the vibratory separator table conveys solid particles left behind to a discharge end of the separator table. In some vibratory separators, the feed end of the separator may be relatively closer to the ground than the discharge end. In such vibratory separators, the angle of inclination may require the movement of particulates in a generally upward direction. In still other vibratory separators, the table may not be angled, thus the vibrating action of the separator alone may enable particle/fluid separation. Other vibratory separators may include other table inclination and/or design variations.

In the oilfield industry, a vibratory separator may be used to separate cuttings from drilling fluid, often called "mud." For example, in some drilling operations, mud may be mixed at the surface of a borehole and pumped downhole at high pressure to the drill bit through a bore of the drill string. Once the mud reaches the drill bit, it may exit through various nozzles and ports where it lubricates and cools the drill bit. As a drill bit pulverizes or scrapes the rock formation at the bottom of the borehole, small pieces of solid material are left behind. The drilling fluid exiting the nozzles at the bit may stir-up and carry the solid particles of rock and formation to the surface within the annulus between the drill string and the borehole. Therefore, the fluid exiting the borehole from the annulus may be a slurry of formation cuttings in drilling mud. Before the mud can be recycled and re-pumped down through nozzles of the drill bit, the cutting particulates may be removed by a separator, such as a vibratory separator.

Methods of monitoring the level of fluid, e.g. wellbore fluid or drilling fluid, within a separator, may be performed according to embodiments of the present disclosure to optimize performance of the separator, for example, to determine if too much or too little drilling fluid is going through the separator or to ensure excess drilling fluid is not inadvertently discarded and improve the longevity of the separator deck. As used herein, the term "separator deck" refers to at least one screen disposed in a frame. According to some embodiments, a separator deck may include multiple screens. Each screen may be coupled to the separator by any means known in the art, for example, tracks, clamping systems, etc. Each separator deck as used herein may occupy a level (a height) of the separator.

FIG. 1 shows an example of an assembly for fluid level measurement that includes a vibratory separator 100, an injection medium supply 110, at least one flow line 120, 122 extending from the injection medium supply 110 to an interior portion of the separator 100, and a pressure transducer 130, 132 disposed along each of the flow lines 120, 122. The separator 100 includes three separator decks or levels: a top separator deck 101, or scalping deck, a middle separator deck 102, and a bottom separator deck 103. Flow back pans 104, 105 are each disposed below the top separator deck 101 and the middle separator deck 102, which route fluid between the separator decks. Other separators may include a different number of separator decks (e.g., one, two, three, etc.) and flow back pans (e.g., zero, one, two, etc.).

During separatory operations, a liquid-solid mixture or drilling fluid 140 may be deposited through an inlet 107 of the vibratory separator onto a feed end of the vibratory separator. The liquid-solid mixture may form a "pool" comprising primarily the liquid-solid mixture on the feed end of the vibratory separator. One or more motors 150 mounted to the vibratory separator 100 may provide motion, e.g., vibratory or elliptical motion, to the separator 100, to shake the separator and contents therein. As the liquid-solid mixture progresses across the top separator deck 101, fluid 140 may drain through a screen disposed in the top separator deck 101 leaving primarily solid matter to be discarded at a discharge end 106. The "beach" as used herein refers to a region where the pool of the liquid-solid mixture transitions to a region consisting of primarily solid matter. As used herein, the term "beach" may refer to a region and not a definite boundary line. The fluid 140 may then flow down a first flow back pan 104 and onto the middle separator deck 102. As the fluid 140 drains through a screen disposed in the middle separator deck 102, additional solid matter may remain on top of the screen, which may be discarded. The fluid 140 may then flow down a second flow back pan 105 and onto the bottom separator deck 103. As the fluid 140 drains through a screen disposed in the bottom separator deck 103, any remaining solid matter may remain on top of the screen, which may be discarded, and the fluid 140 may exit through an outlet 108 of the separator.

Each of the flow lines 120, 122 extend from the injection medium supply 110 to different interior portions of the separator 100, where each opening 121, 123 of the flow lines 120, 122 opens at a different location along a path of fluid flow and/or a different height within the separator 100. The flow lines 120, 122 may be coupled to a side wall or other structural component of the vibratory separator 100, such that each opening 121, 123 opens to an interior volume of the vibratory separator proximate and above one of the separator decks. The openings may be flush with an interior surface of the side wall or other structural component of the vibratory separator 100. The openings may be positioned transverse to the direction of fluid flow across the separator deck. As the fluid 140 flows to a first height at the opening of a first flow line 120 (thereby covering the opening), the resistance to the injection medium flowing out of the first flow line increases, thereby increasing the pressure within the first flow line 120. The pressure transducer 130 disposed along the first flow line 120 measures the pressure through the first flow line 120. A peak in the first flow line pressure 120 measured by the pressure transducer 130 indicates that the fluid level is at least to the first height of the opening to the first flow line 120. As the fluid 140 rises to a second location or height at the opening of the second flow line 122 (to cover the opening), the resistance to the injection medium flowing out of the second flow line increases, thereby increasing the pressure within the second flow line 122. The second pressure transducer 132 disposed along the second flow line 122 measures the pressure there through, and a peak in the second flow line pressure 122 measured by the second pressure transducer 132 indicates that the fluid level is at least to the second height of the opening to the second flow line 122. The pressure transducers 130, 132 may, therefore, indicate a fluid level of the fluid or slurry at a predetermined location as the fluid flows through the vibratory separator 100.

According to embodiments of the present disclosure, an injection medium may be air or other gas, such as an inert gas. The injection medium may be supplied from an injection medium supply such as a gas tank or, when using air, may pumped from the surrounding atmosphere.

When the opening to a flow line is not obstructed, the flow line may have a constant initial pressure. Once the opening is obstructed, the pressure may spike or reach a peak, thereby indicating that a rise in the fluid level has obstructed the opening. The amount of pressure increase constituting a peak may vary depending on various factors, such as the initial pressure, the sensitivity of the pressure measurement device, and/or the material properties of the fluid being measured, but may include any sharp rise in pressure from the initial pressure. Examples of pressure peaks may include, but are not limited to, an increase in pressure by less than 1 percent, an increase in pressure by at least 1 percent, an increase in pressure by at least 5 percent, or an increase in pressure by at least 10 percent or more over the initial pressure.

Conversely, fluid level measurement assemblies may detect a drop in fluid level. When measuring a drop in fluid level, the opening to a flow line may be obstructed, where the flow line has a constant initial pressure. Once the obstruction to the opening is removed (from a drop in the fluid level), the pressure within the flow line may drop, thereby indicating that a drop in the fluid level has removed the fluid from blocking the opening. Examples of pressure drops may include, but are not limited to, a decrease in pressure by less than 1 percent, a decrease in pressure by at least 1 percent, a decrease in pressure by at least 5 percent, or a decrease in pressure by at least 10 percent or more over the initial pressure. The amount of pressure change constituting a pressure drop indicating a drop in fluid level may vary depending on various factors, such as the initial pressure, the sensitivity of the pressure measurement device, and/or the material properties of the fluid being measured, but may include any sharp decrease in pressure from the initial pressure. For example, a peak or drop in pressure may occur when a definite change, either increase or decrease, from a baseline pressure occurs. In contrast, in some embodiments, such as when measuring fluid level in a vibratory separator, when the pressure through a flow line slightly fluctuates from a baseline pressure for a short period of time and then returns to the baseline pressure, such fluctuations may indicate splashing of the fluid, such as from the vibration or shaking of the vibratory separator.

Further, in some embodiments, a pressure peak or drop may be determined by monitoring the pressure in one flow line in relation to the pressure in one or more other flow lines. For example, in some embodiments, the pressure difference between two or more flow lines may be monitored, where a change in the pressure difference between the two or more flow lines may indicate a change in fluid level.

In the embodiment shown, the screening devices are disposed at predetermined angles within the separator 100. The openings to the first and second flow lines 120, 122 open to different heights along one of the separator decks 103 (having a screening device). In embodiments where the separator decks 103 of the separator 100 are angled, a height between the separator deck and the opening to the first flow line 120 and a height between the separator deck and the opening to the second flow line 122 may be the same, while the height of the openings is different with respect to the separator 100, as shown in FIG. 1. As the fluid 140 flows up the separator deck 103 (i.e., as the fluid level increases), the fluid 140 first blocks the opening to the first flow line 120 (opening to a relatively lower height). As the fluid level continues to rise, the fluid 140 may block the opening to the second flow line 122 (opening to a relatively higher height). By having multiple flow lines opening along a separator deck, the flow lines may be used to determine the location of a beach region along the separator deck. In other embodiments, more than one flow line may open to different heights within a separator, for example, along different separator decks (where the separator decks may be at an angle with respect to a horizontal plane extending through the separator or may be co-planar with a horizontal plane extending through the separator). For example, in separators having multiple separator decks at different heights, a flow line may open along each separator deck.

By having flow lines opening to multiple different heights within a container, such as a vibratory separator, multiple changes in the level of fluid may be detected. For example, a multiple flow lines may open to multiple different predetermined heights within a container to determine preset criteria regarding the level of fluid in the container. An optional alarm system may be set up to correspond with the pressure reading system (the pressure transducers set up along the multiple flow lines) to indicate when the preset criteria have been met. For example, a low level flow line may open to a first height within a container that is below a desired fluid level range, and a high level flow line may open to a second height within the container that is above the desired fluid level range. When the fluid level in the container drops below the first height, the pressure transducer set up along the low level flow line may measure a sharp drop in pressure, thereby indicating a drop in the fluid level below the desired fluid level range. Similarly, when the fluid level in the container rises above the second height, the pressure transducer set up along the high level flow line may measure a sharp peak in pressure, thereby indicating an increase in the fluid level above the desired fluid level range. An alarm in communication with the pressure transducer (either wirelessly or through wires) may be set to alert that the fluid level is too high (e.g., when the maximum loading of fluid within a vibratory separator has been reached) or too low (e.g., when a vibratory separator is running dry).

Upon reaching a pre-selected criteria, one or more operations may be conducted in order to change the fluid level. For example, when a low fluid level is indicated (e.g., when the fluid level in a container drops below a low level flow line opening and the pressure transducer set up along the low level flow line measures a sharp drop in pressure), an outlet to the container may be restricted or closed or an inlet (e.g., a valve) may be further opened until the fluid level increases to a desired fluid level range. When a high fluid level is indicated (e.g., when the fluid level in a container rises above a high level flow line opening and the pressure transducer set up along the high level flow line measures a sharp peak in pressure), an outlet to the container may be opened or an inlet may be restricted or closed until the fluid level decreases to a desired fluid level range.

Figure 2:
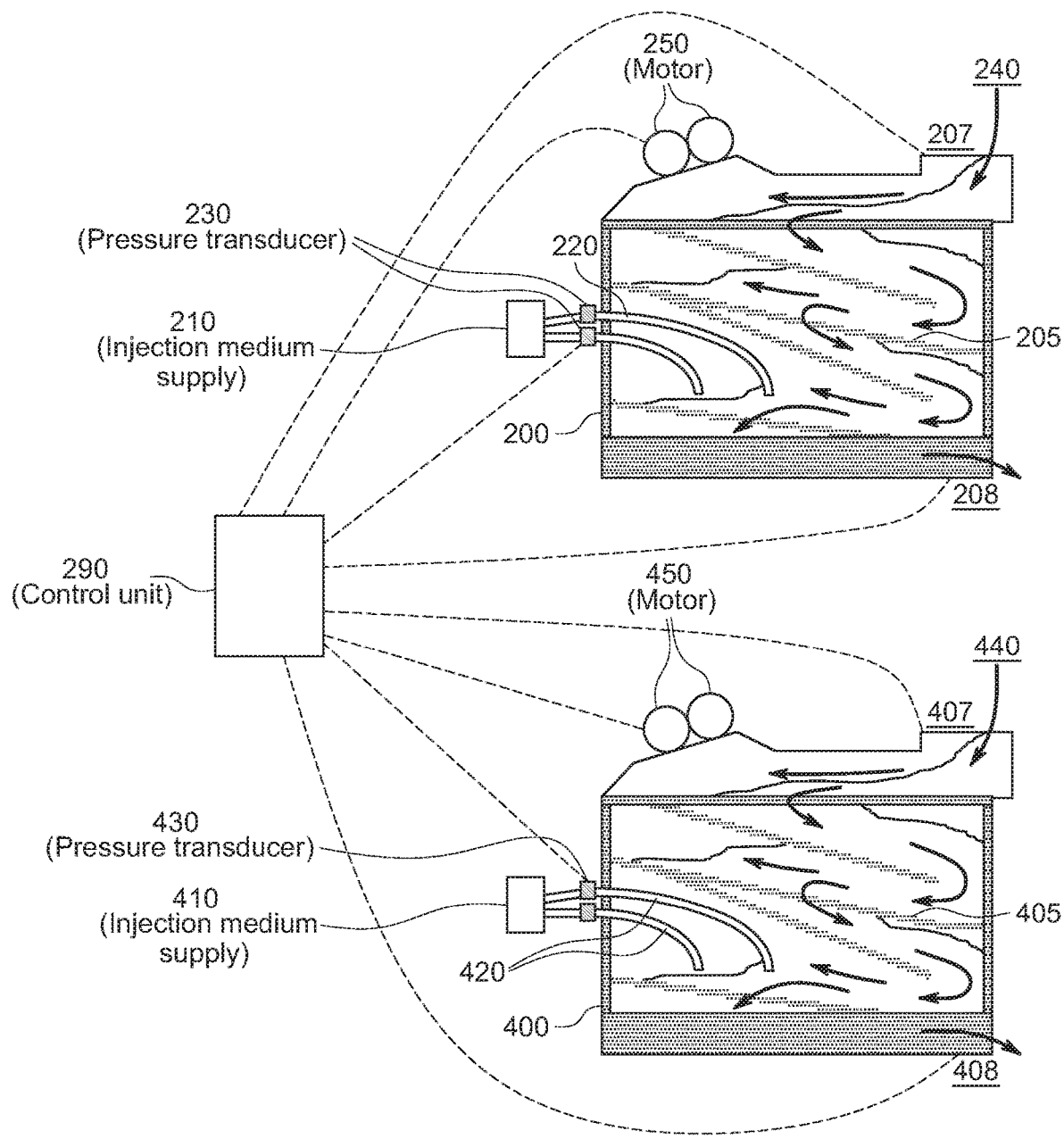
FIG. 2 shows a system of fluid level measurement assemblies according to embodiments of the present disclosure.

In some embodiments, multiple containers may be set up in parallel, where upon reaching pre-selected criteria in fluid levels, fluid flow through one or more of the containers is increased, decreased, or stopped. For example, FIG. 2 shows an example of two vibratory separators 200, 400 that are capable of being operated in tandem. Each vibratory separator 200, 400 has at least one flow line 220, 420 extending from an injection medium supply 210, 410 to an interior portion of the separator 200, 400 and a pressure transducer 230, 430 disposed along each of the flow lines 220, 420. The separators 200, 400 include multiple screening devices 205, 405 therein. During separatory operations, a liquid-solid mixture or drilling fluid 240 may be deposited through an inlet 207 of the first vibratory separator 200, while one or more motors 250 mounted to the first vibratory separator 200 may provide motion, e.g., vibratory or elliptical motion, to the first vibratory separator 200, to shake the separator and contents therein. As the liquid-solid mixture progresses through the screening devices 205, fluid 240 may flow to different levels (heights) within the first vibratory separator, until the fluid 240 finally exits through an outlet 208 of the separator 200.

Flow lines 220 extending from the injection medium supply 210 to different interior portions of the separator 200 open at a different heights within the separator 200. When the fluid 240 flows to a first height at the opening of one of the flow lines 220 (thereby covering the opening), a sharp increase in pressure within the flow line is measured by a pressure transducer 230 disposed along the flow line 220. The sharp increase, or peak in the flow line pressure indicates that the fluid level is at least to the first height within the separator 200. As the fluid 240 rises to a second height at the opening of another one of the flow lines 220 (to cover the opening), a sharp increase in the pressure within the flow line is measured by a pressure transducer disposed along the flow line. The sharp increase or peak in the flow line pressure indicates that the fluid level is at least to the second height within the separator 200. The motor 250 may vibrate the vibratory separator 200 during injection of the injection medium, during flowing fluid 240 within the vibratory separator 200, and/or during measuring pressure changes in the flow lines 220.

When a pre-selected high fluid level is reached, (e.g., when the fluid level reaches a second height or a height above a desired fluid level range), the second vibratory separator 400 may be utilized, for example, by opening the inlet 407 to the separator 400, directing fluid 440 to the second vibratory separator 400, and/or starting the motor 450 mounted to the second vibratory separator 400 to shake the separator 400 and its contents. In some embodiments, when a pre-selected high fluid level is reached, the vibratory separator 200 may be tilted or the angle of inclination of one or more separator decks 205 of the separator 200 may be adjusted (e.g., increased or decreased) to adjust the rate of flow of fluid across separator decks of the separator 200.

In still other embodiments, when a pre-selected high fluid level is reached, the motor(s) of the vibratory separator 200 may be adjusted to adjust the rate of flow of fluid across the separator decks. For example, the motors may be actuated to adjust acceleration of the vibrations (increase or decrease G-force) or the profiles of the vibration motions (e.g., linear, circular, elliptical, or balanced, unbalanced) using, for example, a programmable logic controller ("PLC") and/or a variable frequency drive ("VFD"). In some embodiments, a combination of tilting the first vibratory separator 200, utilizing the second vibratory separator 400, and changing the vibrations imparted by the motor(s) may be conducted when one or more pre-selected high fluid levels are reached. Conversely, when pre-selected low fluid levels are reached, one or more vibratory separators may be shut down, one or more vibratory separators may be tilted back to a horizontal position (e.g., an initial position prior to tilting to one side due to a high fluid level), and/or the vibrations imparted by the motor(s) may be adjusted.

Although two vibratory separators 200, 400 are shown to be operable together (depending on the pre-selected desired fluid level ranges and the fluid levels reached in each vibratory separator) in the embodiment shown in FIG. 2, more than two vibratory separators may be operable in parallel. For example, three, four, or more vibratory separators may be operable in parallel, where pre-selected high and/or low fluid levels may be set in each of the vibratory separators by positioning the openings of one or more flow lines at pre-selected heights within each vibratory separator. Upon reaching the pre-selected fluid levels, one or more of the vibratory separators may be tilted, one or more of the vibratory separators may be turned on (e.g., by opening the inlet to the separator and/or turning on a motor mounted to the separator to shake the separator), one or more of the vibratory separators may be turned off (e.g., by closing the inlet to the separator and/or turning off a motor mounted to the separator), the inlet to one or more of the vibratory separators may opened, enlarged, closed, or restricted, and/or the vibrations imparted by the motor(s) may be adjusted.

According to embodiments of the present disclosure, one or more fluid level measurement assemblies, such as the vibratory separators discussed above, may be in communication with a control unit or computational device, where the control unit may be in communication with one or more components of the fluid level measurement assembly. For example, a control unit may be in communication (wireless or wired communication) with one or more pressure transducers, one or more inlets, one or more outlets, and/or one or more motors in fluid level measurement assemblies.

Referring again to FIG. 2, a control unit 290 is in communication with both of the fluid level measurement assemblies. As shown, the control unit 290 may be in communication with the pressure transducers 230, 430, the motors 250, 450, the inlets 207, 407, and the outlets 208, 408 of the first and second vibratory separators 200, 400. When the control unit 290 is in wireless communication with the components, the control unit may have one or more receivers for receiving a signal from each component. For example, the control unit 290 may have a receiver for receiving a signal from the pressure transducers 230, 430 indicating when a sharp pressure change has been measured, thereby indicating a change in the fluid level.

The control unit 290 may also be in communication with the inlets 207, 407 of the first and second vibratory separators 200, 400 via inlet control devices disposed at the inlets 207, 407, where the inlet control devices may control the opening, closing and/or change in size of the inlet. The control unit 290 may be in communication with the outlets 208, 408 of the first and second vibratory separators 200, 400 via outlet control devices disposed at the outlets 208, 408, where the outlet control devices may control the opening, closing and/or change in size of the outlet. Inlet control devices and outlet control devices may include one or more components (e.g., magnetic or piezoelectric components) that are movable in response to an electric signal. Further, when the control unit 290 is in wireless communication with an inlet control device and/or an outlet control device, the inlet control device and/or outlet control device may include an inlet control receiver and/or outlet control receiver, respectively, for receiving a signal from the control unit 290. When the control unit 290 is in wireless communication with motors 250, 450, the motors 250, 450 may have receivers for receiving signals from the control unit 290. Output signal formats for wireless communication with a control unit may include, for example, current loops, analog voltages, and digital signals.

By having a control unit in communication with one or more components of a fluid level measurement assembly according to embodiments of the present disclosure, the components may be operated in response to detecting one or more preselected fluid levels within the fluid level measurement assembly. For example, referring to FIG. 2, when one or more pressure transducers 230 detect a sharp change in pressure (either an increase or decrease), the pressure transducers 230 may communicate the change in pressure to the control unit 290, thereby indicating the fluid level has reached a certain level (i.e., to the heights where the flow lines 220 open). Based on the fluid level indicated, the control unit 290 may then communicate with one or more other components (e.g., motors 250, 450, inlets 207, 407, and/or outlets 208, 408) to alter the fluid level in the first vibratory separator 200 and/or the second vibratory separator 400. In some embodiments, a control unit may be in communication with one or more injection medium sensors in the injection medium supplies, for example, to indicate if the injection medium is running low. Further, in some embodiments, a control unit may be in communication with at least one pressure transducer disposed on at least one flow line to control the flow rate of the injection medium flowing through the flow line (e.g., by sending a signal to a valve within the flow line to either restrict or enlarge an opening through which the injection medium flows).

Figure 3:
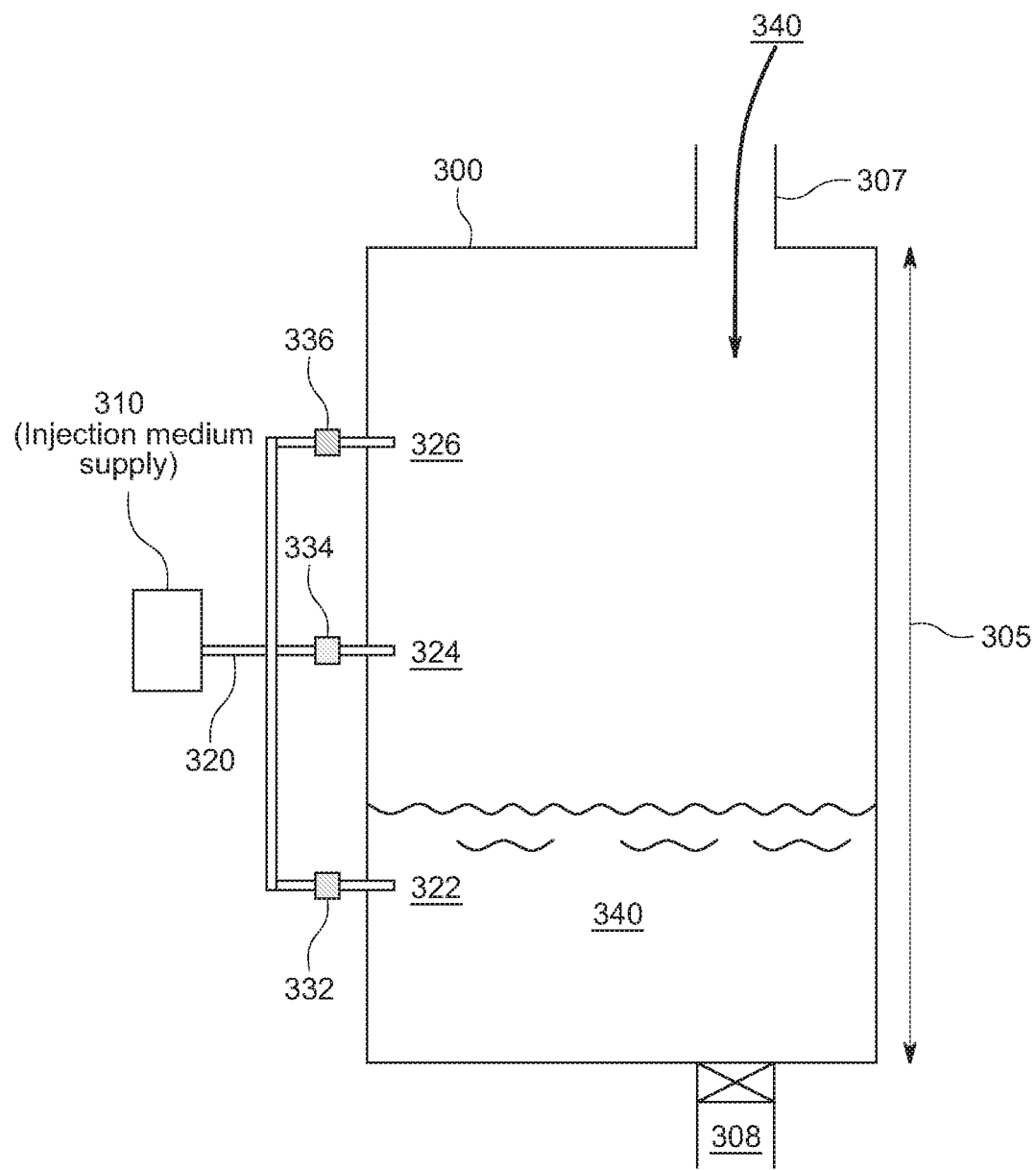
FIG. 3 is a cross sectional view of a fluid level measurement assembly according to embodiments of the present disclosure.

Although vibratory separators are shown in the embodiments of FIGS. 1 and 2, one or more container types other than vibratory separators may be operable alone or together, as described above. For example, FIG. 3 shows an example of a fluid level measurement assembly according to embodiments of the present disclosure. The fluid level measurement assembly includes a container 300 having an inlet 307 and an outlet 308, at least one flow line 322, 324, 326 extending from an injection medium supply 310 to different interior portions within the container 300, each flow line 322, 324, 326 opening at a different height 305 along the container 300. As shown, flow line 322 opens at a lowest level height, flow line 324 opens at a middle level height, and flow line 326 opens at a highest level height. Further, in the embodiment shown, flow lines 322, 324, 326 branch from a main flow line 320. In other embodiments, one or more flow lines may extend separately from an injection medium supply, or one or more flow lines may branch from different main flow lines. A pressure transducer 332, 334, 336 is disposed along each of the flow lines 322, 324, 326, respectively, to measure the pressure within each flow line 322, 324, 326. The outlet 308 to the container 300 may be sealed or restricted, such as with a valve, so that as fluid 340 is added through the inlet 307 of the container, the fluid level rises. When the fluid level exceeds the lowest level height, thereby covering the opening of flow line 322, the pressure transducer 332 measures a sharp increase or peak in pressure (e.g., at least 1 percent increase, at least 5 percent increase, at least 10 percent increase, or other sharp rise in pressure from an initial pressure), indicating the fluid level within the container 300.

FIG. 4 shows an example of a graph of pressure readings from pressure transducers 332, 334, and 336. The pressure measurements from transducers 332, 334, and 336 are all constant until the point in time X, when a sharp increase in pressure is measured by transducer 332 (the pressure transducer measuring the flow line 322 opening at the lowest level height). This sharp increase or peak in pressure indicates that the fluid 340 has exceeded the lowest level height at the point in time X. Units for the increase in pressure depend on, for example, the initial pressure within the flow lines, the viscosity of the fluid entering the container, and the size of the opening of the flow lines.

Referring again to FIG. 3, as the fluid level exceeds or falls below the lowest level height, the middle level height and/or the highest level height, the outlet 308 and/or inlet 307 may be opened, enlarged, restricted or closed to either increase or decrease the fluid level to a desired fluid level range. In some embodiments, a control unit may be used to control the inlet and/or outlet based on the pressure measurements of the pressure transducers.

According to embodiments of the present disclosure, a method for measuring fluid level may include providing at least one fluid within a container, flowing an injection medium through at least one flow line into an interior portion of the container at one or more heights along the container, altering the amount of fluid within the container during the flowing of the injection medium, and measuring the pressure through the at least one flow line. A sharp change in the pressure through a flow line may indicate either a rise in fluid level (due to a sharp increase or peak in pressure through the flow line) or a drop in fluid level (due to a sharp decrease in pressure through the flow line). Based on the change in pressure through one or more flow lines, the input or/and output of fluid through the container may be altered to raise or lower the fluid level to a desired fluid level range.

Alternatively, or in addition to, altering the fluid level in a first container based on a measured change in pressure through one or more flow lines opening to different heights within the container (thereby indicating an increase or decreased in the fluid level of the first container), at least one fluid may be added to at least one additional container, and/or at least one fluid may be restricted or prevented from entering at least one additional container.

In some embodiments, an injection medium may be flowed through at least two flow lines, each flow line opening to interior portions of the container at different heights. A change in pressure measured through each of the flow lines may be inputted into an algorithm to calculate a rate the fluid is either filling or draining the container. For example, a fluid level measurement assembly may be calibrated with a control algorithm to determine a baseline pressure of an injected medium through one or more flow lines. Different magnitudes of increases and decreases in pressure from the baseline pressure through one or more flow lines may be inputted into the algorithm to determine if a change in fluid level has occurred or if the viscosity of the fluid has changed (e.g., if a relatively more viscous fluid has been added to fluid within the container or if a relatively less viscous fluid has been added to the fluid within the container).

Further, in some embodiments, various fluid properties may be determined by injecting an injection medium through at least one flow line opening at different heights along a container and measuring any pressure change within the flow lines. For example, the injection medium may be flowed at a constant initial flow rate through each flow line while fluid is being added to the container. When the fluid reaches a fluid level covering the opening to one or more flow lines, the pressure through the flow line(s) may sharply increase to a peak pressure flow rate. The difference in pressure measured through the flow line between the initial flow rate and the peak pressure flow rate may be used, for example, to calculate the density of the fluid. For example, using a fluid level measurement assembly described herein with a tank or similar component to receive a liquid with an undetermined density, the pressure difference between two pressure transducers disposed at a preset vertical distance from one another may be used to calculate a density of the liquid column between the transducers. The calculation may be adjusted to account for any change in density caused by the injection of injection medium injected by the fluid level measurement assembly.

By using fluid level measurement assemblies described herein to determine a fluid level (or fluid level range) within a container, fluid level of a turbulent fluid (e.g., fluid being shaken or vibrated in a vibratory separator) may be determined. Further, relatively small sized flow lines and pressure transducers disposed along the flow lines allows for fluid level determination in compact spaces or otherwise difficult spaces to determine fluid level. For example, flexible flow lines and/or rigid flow lines may run along complex pathways from an injection medium supply to one or more different heights within a container, or flexible and/or rigid flow lines may run through compact spaces from an injection medium supply to one or more different heights within a container.

Although the preceding description has been described herein with reference to particular means, materials and embodiments, it is not intended to be limited to the particulars disclosed herein. Rather, it extends to all functionally equivalent structures, methods and uses, such as are within the scope of the appended claims.

What is claimed is:

1. An apparatus, comprising:
a vibratory separator defining an interior portion and comprising at least one separator deck disposed in the interior portion, wherein the at least one separator deck comprises a screen oriented at a non-zero angle with respect to a horizontal plane;
a fluid level measurement assembly coupled to the vibratory separator, the fluid level measurement assembly comprising:
an injection medium supply;
a first flow line extending from and fluidly coupling the injection medium supply to the interior portion of the vibratory separator, wherein the injection medium supply is configured to inject gas into the interior portion through the first flow line, and wherein the first flow line defines a first opening that is proximate to and above the screen;
a first pressure transducer coupled to the first flow line and configured to measure a first pressure therein;
a second flow line extending from and fluidly coupling the injection medium supply to the interior portion of the vibratory separator, wherein the first flow line defines the first opening, wherein the second flow line defines a second opening, and wherein the first opening and the second opening are located at different heights within the interior portion; and
a second pressure transducer coupled to the second flow line and configured to measure a second pressure therein; and
a control unit in communication with the fluid level measurement assembly and configured to determine a location of a beach region along the at least one separator deck based on the first pressure and the second pressure.

2. The apparatus of claim 1, wherein the first opening is positioned at a first end of the at least one separator deck, and the second opening is positioned at a second end of the at least one separator deck.

3. The apparatus of claim 1, wherein the control unit is in further communication with the vibratory separator.

4. The apparatus of claim 3, wherein the control unit is in further communication with at least one additional vibratory separator and at least one additional fluid level measurement assembly.

5. A method for measuring fluid, comprising:
providing at least one fluid within an interior portion defined by a vibratory separator, wherein the at least one fluid flows on a screen positioned within the interior portion, and wherein the screen is oriented at a non-zero angle with respect to a horizontal plane;
flowing an injection medium through a first flow line into the interior portion of the vibratory separator, the injection medium contacting the at least one fluid, wherein the first flow line defines an opening that is proximate to and above the screen;
measuring a first pressure through the first flow line;
flowing the injection medium through a second flow line into the interior portion of the vibratory separator, the first flow line and the second flow line opening to the interior portion of the vibratory separator at different heights;
measuring a second pressure through the second flow line; and
determining a location of a beach region along the screen based on the first pressure and the second pressure.

6. The method of claim 5, further comprising inputting into an algorithm a change in pressure measured through the first flow line and the second flow line to calculate a rate of the at least one fluid through the vibratory separator.

7. The method of claim 5, further comprising controlling a flow rate of the injection medium with a control unit in communication with at least one pressure transducer disposed on the first flow line.

8. The method of claim 5, further comprising adding the at least one fluid to at least one additional vibratory separator after detecting a change in the pressure through the first flow line.

9. The method of claim 5, further comprising restricting the at least one fluid from entering at least one additional vibratory separator after detecting a change in the pressure through the first flow line.

10. The method of claim 5, further comprising vibrating the vibratory separator during the flowing of the injection medium.

11. The method of claim 5, further comprising sending a signal to a control unit after detecting at least a 1 percent change in the pressure.

12. The method of claim 11, further comprising detecting a second change in the pressure.

* * * * *